United States Patent Office 2,744,081
Patented May 1, 1956

2,744,081

COMPOSITIONS COMPRISING ACRYLONITRILE POLYMERS AND TRI (β-CYANOETHYL) NITROMETHANE

Eugene L. Ringwald and Alfred B. Craig, Decatur, Ala., assignors to The Chemstrand Corporation, Decatur, Ala., a corporation of Delaware No Drawing. Application May 27, 1953,
Serial No. 357,896

18 Claims. (Cl. 260—32.4)

This invention relates to new compositions of matter and products prepared therefrom. More particularly, the invention is concerned with the production of new solutions of acrylonitrile polymers and to shaped articles, such as films, fibers, filaments, sheets, ribbons, tubes, and the like, which can be formed therefrom.

The acrylonitrile polymers which are useful in this invention include copolymers and terpolymers containing up to 99% of acrylonitrile, but specifically excludes polyacrylonitrile and copolymers containing more than 99% of acrylonitrile.

It is known that solutions of acrylonitrile polymers can be prepared by dissolving such polymers in various organic solvents or in aqueous solutions of certain inorganic metal salts. While such solutions may be employed for the manufacture of shaped articles, certain difficulties are encountered in their preparation and use. When solutions prepared with metal salts are employed, the shaped articles produced therefrom contain substantial deposits of the metal salts used which results in discontinuous or non-uniform structures. The deposits of the metal salts are extremely difficult to remove completely and even when removed completely, numerous voids and weak spots are left in the structures, which results in a spongy structure.

When various known organic solvents are employed in the formation of shaped articles from solutions of acrylonitrile polymers, difficulties are also encountered. Acrylonitrile polymers are difficultly soluble in such organic solvents without resort to complicated procedures, such as careful preparation of the polymers, slurrying or prolonged stirring, special steps such as precooling the solvent and mix, prolonged heating, and the like. These difficulties become greater as the proportion of acrylonitrile in the polymer is increased. In many of the successfully prepared solution of acrylonitrile polymers, there is a tendency for the polymers to form gel particles, particularly upon standing or exposure to air. In addition, many of the known organic solvents are inferior with respect to solvent properties, or are too costly to provide economical solutions, or are too volatile or unstable at the temperatures employed in normal operations.

Accordingly, the primary object of the present invention is to provide a new solvent for acrylonitrile polymers which is unusually effective in dissolving such polymers. Another object of the invention is the preparation of stable solutions of acrylonitrile polymers which can be readily formed into shaped articles by conventional methods. Still another object is to provide improved plasticized acrylonitrile polymers and shaped articles prepared therefrom. Other objects and advantages of the present invention will be apparent from the description thereof hereinafter.

In general, the objects of the present invention are accomplished by dispersing the acrylonitrile polymers, preferably in finely divided form, in tri(β-cyanoethyl) nitromethane. The dispersion is then heated with stirring, tumbling or other agitation until a free-flowing, uniform, homogeneous solution is obtained. Usually heating to a temperature within the range of 115° to 200° C. is sufficient to bring about complete dissolution of the polymer. The tri(β-cyanoethyl) nitromethane solutions of acrylonitrile polymers are clear and homogeneous and readily susceptible to being formed and/or drawn into shaped articles by known and conventional procedures.

Tri(β-cyanoethyl) nitromethane is prepared by condensing nitromethane and acrylonitrile by known procedures, for example, by the procedure described by Bruson and Riener, Jour. Amer. Chem. Soc., 65, 23–27 (1943).

In the preferred practice of the invention the polymers of acrylonitrile are employed in a finely divided form. Although massive polymers may be ground to desirable size, the selection of a suspension polymerization procedure, in accordance with the principles set out hereinafter, will produce the desired sub-divided state directly without resort to separate comminution procedures.

The polymers which may be dissolved in tri(β-cyanoethyl) nitromethane to form solutions for the production of shaped articles, as described herein, are copolymers of acrylonitrile with at least 1% of other mono-olefinic compounds polymerizable therewith, and mixtures of acrylonitrile polymers with other polymeric compositions, including olefinic polymers or other types of polymeric substances. These mixtures, or blended polymeric compositions, are especially useful for the purpose of developing dye-receptive polymers, for example by blending non-dyeable acrylonitrile polymers with a minor proportion of a polymer chemically reactive with dyestuff. In general, there is a minimum proportion of acrylonitrile which should be present in polymeric form in order to have adequate tensile properties in the fibers prepared therefrom. Thus, a polymer of monomeric mixture of which acrylonitrile is at least 70% of the polymerizable content, is useful in the practice of this invention.

Useful polymers are the copolymers and terpolymers of 80 or more percent of acrylonitrile and one or more percent of other mono-olefinic monomers. Suitable other monomers include, vinyl acetate and other vinyl esters of monocarboxylic acids, vinylidene chloride, vinyl chloride and other vinyl halides, dimethyl fumarate and other dialkyl esters of fumaric acid, dimethyl maleate and other dialkyl esters of maleic acid, methyl acrylate and other alkyl esters of acrylic acid, styrene and other vinyl substituted aromatic hydrocarbons, methyl methacrylate and other alkyl esters of methacrylic acid, methacrylonitrile, alpha-vinylpyridine and other vinyl substituted heterocyclic nitrogen ring compounds, such as the vinyl imidazoles, etc., the alkyl substituted vinylpyridines, vinyl chloroacetate, allyl chloroacetate, methallyl chloroacetate, allyl glycidyl ether, methallyl glycidyl ether, allyl glycidyl phthalate and the corresponding esters of other aliphatic and aromatic dicarboxylic acids, glycidyl acrylate, glycidyl methacrylate and other mono-olefinic monomers copolymerizable with acrylonitrile. As an example of a terpolymer useful in this invention there may be named one containing 90% to 94% acrylonitrile, 4% to 8% 2-methyl-5-vinylpyridine, and 2% vinyl acetate.

Many of the readily available comonomers for polymerization with acrylonitrile form copolymers which are not reactive with dyestuffs and may, therefore, be impossible or difficult to dye by conventional techniques. Accordingly, these non-dyeable fiber-forming copolymers may be blended with polymers or copolymers which are in themselves more dye-receptive by reason of their physical structure or by reason of the presence of functional groups which are chemically reactive with the dyestuff, whereby the dyestuff is permanently bonded to the polymer in a manner which lends resistance to the usual laundering and dry-cleaning procedures. Suitable blending polymers may be polyvinylpyridine, polymers of alkyl substituted vinylpyridines, polymers of other vinyl substituted N-heterocyclic compounds, the copolymers of the various vinyl substituted N-heterocyclic compounds and other copolymerizable monomers, particularly acrylonitrile.

Of particular utility are the blends of non-dyeable acrylonitrile polymers of good fiber-forming properties, for example a copolymer of from 80 to 99 percent acrylonitrile and from one to 20 percent of vinyl acetate, and a polymer of vinylpyridine or an alkyl substituted vinylpyridine and acrylonitrile, the said acrylonitrile being present in substantial proportions, for example up to 80 percent to provide heat and solvent resistance, and a substantial proportion of the pyridine or derivative thereof to render the blend receptive to acid dyestuffs, for example, polymers, containing from 30–100% of a vinylpyridine. Of particular utility are the blends of copolymers of 80 to 99 percent acrylonitrile and one to 20 percent vinyl acetate and sufficient copolymer of 10 to 70 percent acrylonitrile and 30 to 90 percent vinylpyridine to produce a blended composition with a total of 3 to 8 percent by weight of vinylpyridine.

In the practice of this invention, as in the preparation of shaped articles from acrylonitrile polymers by prior art methods, the physical properties of the polymers are of substantial importance. It is desirable that the polymers be uniform with respect to molecular weight, particle size, and chemical composition. Accordingly, the methods for their preparation must be selected so as to induce the uniformity of chemical and physical properties. In general, the molecular weight should be in excess of 10,000 and preferably in excess of 25,000, the molecular weights being determined by measuring the viscosity of dilute solutions in the manner well-known in the art.

It has been found that polymers and copolymers of desirable physical properties are those which are prepared by the aqueous suspension technique, wherein the monomers or mixture of monomers are added to an aqueous medium maintained under conditions suitable for a rapid but controlled polymerization. The aqueous medium should contain a water-soluble peroxy catalyst and a dispersing agent which induces the precipitation of a finely divided polymer during the reaction. In order to insure the optimum concentration of peroxy catalyst and dispersing agent it is frequently desirable to add the catalyst and dispersing agent continuously or intermittently throughout the course of the reaction. The preferred practice involves the charging of the monomers or mixtures of monomers, gradually during the course of the reaction at a uniform rate or at a varying rate which permits the maintenance of the reaction at a constant temperature, for example, the reflux temperature.

The acrylonitrile polymers are prepared by polymerization in the presence of water-soluble peroxide catalysts, such as the alkali metal salts of the various peroxy acids, for example, sodium perborate, sodium percarbonate, and potassium persulfate. Stabilizing or dispersing agents, such as the water-soluble salts of the sulfonated mahogany acids, salts of the formaldehyde condensed naphthalene sulfonic acids, salts of sulfonated alkylbenzenes, salts of triethanolamine, sodium stearate and other salts of carboxylic acids, and mixtures thereof prepared by the saponification of animal and vegetable oils.

Desirable methods for the preparation of acrylonitrile polymers of uniform molecular weight involve the use of regulators, for example, tertiary dodecyl mercaptan, beta-mercaptoethanol, thioglycolic acid, beta-mercaptopropionic acid, and acetaldehyde. The nature of the other monomeric substances being polymerized with the acrylonitrile may determine the type of substance useful as a regulator. For example, in the copolymerization of acrylonitrile with monomers, such as vinyl acetate, methyl methacrylate, and styrene, thioglycolic acid is unusually beneficial. However, in the preparation of copolymers of the basic monomers, such as vinylpyridine, the use of tertiary aliphatic mercaptans will be found to be very effective.

Tri ($\beta$-cyanoethyl) nitromethane is an excellent solvent plasticizer for acrylonitrile polymers since it is soluble in a wide range of proportions with the said polymers. This invention also contemplates, therefore, solid solutions of acrylonitrile polymers, as well as liquid solutions thereof. Since the solvent has a relatively high boiling point, shaped articles may be made from the solutions and at least a portion of the solvent may be retained therein as a plasticizer for the articles.

The solutions of acrylonitrile polymers in tri ($\beta$-cyanoethyl) nitromethane may be used in the production of various fabricated structures such, for example, as films, filaments, bars, rods, tubes, etc., in accordance with general techniques and using apparatus now generally known to those skilled in the art, the detailed operating conditions being suitably modified when required.

In one method of making extruded articles, the solution is extruded through a spinneret or die into a liquid coagulating bath which will coagulate the polymerization product in the spinning solution. The liquid into which the spinning solution is extruded is one which is miscible with tri ($\beta$-cyanoethyl) nitromethane and which, as a result of extracting the solvent, is capable of coagulating the polymerization product.

To obtain fibers of optimum physical properties polymers of molecular weights in excess of 25,000 are used, and with such polymers it is only possible to dissolve a relatively small proportion in the tri ($\beta$-cyanoethyl) nitromethane without exceeding practical viscosity values. Although as little as 5% of polymer can be used in the spinning solution, such low concentrations are undesirable because they necessitate the removal of too much solvent from the extruded solution, thereby increasing solvent recovery cost, as well as reducing spinning speed and lengthening the period required for coagulation. The concentration of polymer in the spinning solution is usually between eight and 35 percent, but concentrations up to the maximum are practicable. The concentration of the polymer will ultimately be determined by considering the desired physical properties of the fiber and the speed of spinning, the latter depending upon the concentration and viscosity of the spinning solution. The viscosity will depend upon the chemical composition and molecular weight of the polymer, and the optimum concentration can best be determined by selecting a uniform high molecular weight polymer having good fiber-forming properties, and dissolving a given amount in as little of the tri ($\beta$-cyanoethyl) nitromethane as possible to form a viscous solution capable of being spun.

Further details of the practice of the present invention are set forth with respect to the following example, which is merely intended to be illustrative and not limitative.

Example

A finely divided copolymer containing 95% acrylonitrile and 5% vinyl acetate by weight in the polymer molecule was dispersed in tri ($\beta$-cyanoethyl) nitromethane. Thereafter, the dispersion was heated to a temperature of approximately 150° C. with stirring and a clear homogeneous solution or dope resulted which contained 10% solids. Fibers could readily be drawn from this clear solution.

Tri ($\beta$-cyanoethyl) nitromethane solutions of acrylonitrile polymers can also be cast into the form of films by the usual conventional methods, for example, by passing the solution from a hopper onto a rotating metallic surface under the smoothing action of a doctor blade. In addition, molded articles can be prepared from the tri ($\beta$-cyanoethyl) nitromethane solutions of the present invention. Further, the solutions or compositions of the instant invention may be employed as lacquers, coating materials, etc. Numerous other advantages of the present invention will be apparent to those skilled in the art.

It is to be understood that changes and variations may be made without departing from the spirit and scope of the invention as defined in the appended claims.

We claim:

1. A new composition of matter comprising a homogeneous miscible mixture of tri ($\beta$-cyanoethyl) nitromethane and an acrylonitrile polymer containing up to 99% of acrylonitrile.

2. A new composition of matter comprising a homogeneous miscible mixture of tri ($\beta$-cyanoethyl) nitromethane and a polymer of monomeric substances of which acrylonitrile is at least 70% but not more than 99%, by weight of the polymerizable content.

3. A new composition of matter as defined in claim 2 wherein the polymer is a copolymer containing by weight in the polymer molecule from 90 to 99% acrylonitrile and from one to 10% vinyl acetate.

4. A new composition of matter as defined in claim 2 wherein the polymer is a copolymer containing by weight in the polymer molecule from 90 to 99% acrylonitrile and from one to 10% of a vinylpyridine.

5. A new composition of matter as defined in claim 2 wherein the polymer is a copolymer containing by weight in the polymer molecule from 90 to 99% acrylonitrile and from one to 10% vinylimidazole.

6. A new composition of matter as defined in claim 2 wherein the polymer is a copolymer containing by weight in the polymer molecule from 90 to 99% acrylonitrile and from one to 10% methyl acrylate.

7. A new composition of matter as defined in claim 2 wherein the polymer is a blend comprising a binary interpolymer containing by weight in the polymer molecule from 90 to 99% acrylonitrile and from one to 10% of vinyl acetate, with a sufficient quantity of a polymer containing by weight in the polymer molecule from 0 to 70% of acrylonitrile and from 30 to 100% of a vinylpyridine, to give an overall vinylpyridine content of 3 to 8% by weight.

8. A new composition of matter as defined in claim 2 wherein the polymer is a terpolymer containing by weight in the polymer molecule at least 2% vinyl acetate, from 90 to 94% of acrylonitrile, and from 4 to 8% of 2-methyl-5-vinylpyridine.

9. As an article of manufacture, a shaped article formed from the composition of claim 3, and containing a small amount of residual tri ($\beta$-cyanoethyl) nitromethane as a plasticizer.

10. As an article of manufacture, a shaped article formed from the composition of claim 4 and containing a small amount of residual tri ($\beta$-cyanoethyl) nitromethane as plasticizer.

11. As an article of manufacture, a shaped article formed from the composition of claim 5 and containing a small amount of residual tri ($\beta$-cyanoethyl) nitromethane as a plasticizer.

12. As an article of manufacture, a shaped article formed from the composition of claim 6 and containing a small amount of residual tri ($\beta$-cyanoethyl) nitromethane as a plasticizer.

13. A process for preparing a fiber-forming solution comprising mixing a polymer of monomeric substances of which acrylonitrile is at least 70%, but not more than 99%, by weight of the polymerizable content with tri ($\beta$-cyanoethyl) nitromethane and then heating the mixture to a temperature within the range of 115° to 200° C.

14. A new composition of matter, comprising a homogeneous miscible mixture of 65 to 95% by weight of tri ($\beta$-cyanoethyl) nitromethane and from 5 to 35% of a copolymer of from 80 to 99% by weight of acrylonitrile and from 1 to 20% of another copolymerizable monomer.

15. A new composition of matter, comprising a homogeneous miscible mixture of 65 to 95% by weight of tri ($\beta$-cyanoethyl) nitromethane and from 5 to 35% of a copolymer of from 80 to 99% by weight of acrylonitrile and from 1 to 20% of vinyl acetate.

16. A new composition of matter, comprising a homogeneous miscible mixture of 65 to 95% by weight of tri ($\beta$-cyanoethyl) nitromethane and from 5 to 35 percent of a copolymer of from 80 to 99% by weight of acrylonitrile and from 1 to 20 percent of a vinylpyridine.

17. A new composition of matter, comprising a homogeneous miscible mixture of 65 to 95% by weight of tri ($\beta$-cyanoethyl) nitromethane and from 5 to 35% of a blend of copolymers, one of which contains 80 to 99% by weight of acrylonitrile and from 1 to 20% of another copolymerizable monomer, and the other of which contains from 30 to 90% by weight of a vinylpyridine and 10 to 70% acrylonitrile, the two copolymers being blended in such proportions that from 3 to 8% of the total weight of the blend is vinylpyridine.

18. A new composition of matter, comprising a copolymer of from 80 to 99% by weight of acrylonitrile and from 1 to 20% of another copolymerizable monomer and as a plasticizer for said copolymer, a small amount of tri ($\beta$-cyanoethyl) nitromethane.

References Cited in the file of this patent

UNITED STATES PATENTS 2,515,206   Finzel et al. _____ July 18, 1950